US007684770B2

(12) United States Patent
Matsuo

(10) Patent No.: US 7,684,770 B2
(45) Date of Patent: Mar. 23, 2010

(54) TRANSMISSION DEVICE AND RECEPTION DEVICE

(75) Inventor: Michiaki Matsuo, Machida (JP)

(73) Assignee: Panasonic Corporation, Osaka (JP)

( * ) Notice: Subject to any disclaimer, the term of this patent is extended or adjusted under 35 U.S.C. 154(b) by 1210 days.

(21) Appl. No.: 10/527,247

(22) PCT Filed: Apr. 15, 2004

(86) PCT No.: PCT/JP2004/005388

§ 371 (c)(1),
(2), (4) Date: Mar. 9, 2005

(87) PCT Pub. No.: WO2004/093362

PCT Pub. Date: Oct. 28, 2004

(65) Prior Publication Data

US 2006/0008085 A1 Jan. 12, 2006

(30) Foreign Application Priority Data

Apr. 18, 2003 (JP) ............................ 2003-113881
Apr. 6, 2004 (JP) ............................ 2004-111813

(51) Int. Cl.
*H04B 7/02* (2006.01)

(52) U.S. Cl. ....................... 455/101; 455/352; 455/102; 455/44; 455/45; 455/63.3; 455/66.1; 455/69; 455/94

(58) Field of Classification Search ................. 455/101, 455/102, 44, 45, 63.3, 66.1, 69, 94, 352
See application file for complete search history.

(56) References Cited

U.S. PATENT DOCUMENTS 5,181,246 A * 1/1993 Miki ........................... 380/34
6,571,090 B1 * 5/2003 Moriyama et al. ....... 455/277.1
7,027,782 B2 * 4/2006 Moon et al. ................. 455/102
2005/0215206 A1 * 9/2005 Granstrom et al. .......... 455/102

FOREIGN PATENT DOCUMENTS

| | | |
|---|---|---|
| JP | 01-212041 A | 8/1989 |
| JP | 04-101527 A | 4/1992 |
| JP | 07-250116 | 9/1995 |

(Continued)

OTHER PUBLICATIONS

International Search Report for application No. PCT/JP2004/005388 dated Jul. 27, 2004.

*Primary Examiner*—Lana N Le
*Assistant Examiner*—Ping Y Hsieh
(74) *Attorney, Agent, or Firm*—RatnerPrestia

(57) ABSTRACT

There are disclosed a transmission device and a reception device having a high secrecy making it difficult to wire tap by a third device. The transmission device includes a modulation section which can be modulated by a plurality of modulation methods and a transmission section which can transmit a radio signal by using a plurality of carrier frequencies. Moreover, the reception device includes a demodulation device which can demodulate by using a plurality of demodulation methods and a reception section which can receive a radio signal by using a plurality of carrier frequencies. The transmission communication method or the reception communication method is changed as the time elapses by changing the combination of the modulation method or demodulation method and the carrier frequency, thereby transmitting or receiving data.

19 Claims, 7 Drawing Sheets

FOREIGN PATENT DOCUMENTS

| | | | |
|---|---|---|---|
| JP | 07-336328 | A | 12/1995 |
| JP | 08-130766 | | 5/1996 |
| JP | 09-135225 | | 5/1997 |
| JP | 10-173722 | | 6/1998 |
| JP | 10-327130 | A * | 8/1998 |
| JP | 10-313274 | | 11/1998 |
| JP | 0-327130 | A | 12/1998 |
| JP | 2002-281003 | A | 9/2002 |

* cited by examiner

TRANSMISSION DEVICE AND RECEPTION DEVICE

This application is a U.S. National Phase Application of PCT International Application PCT/JP2004/005388.

TECHNICAL FIELD

The present invention relates to a transmission device and a reception device doing a data communication. More particularly it relates to a transmission device and a reception device having a high secrecy making it difficult to intercept or wire tap by a third device other than the device that is supposed to receive the data from the device that transmits data.

BACKGROUND ART

A conventional transmission device and a conventional reception device doing a data communication in between can work with the same carrier frequency and with the same modulation and demodulation methods. Before starting a data communication, the transmission device and the reception device determine a carrier frequency and a modulation method and a demodulation method to be used between them.

A transmission device and a reception device, which carry out a data communication in bursts by the time division multiple access (TDMA) method, change a modulation method and a demodulation method or a rate of an error-correcting code one after another for data in a burst in response to a propagation environment. This is disclosed in Japanese Patent Unexamined Publication No. H07-250116 for expecting an improvement in transmission quality.

Between a base station and a terminal in a cellular system, the following technique has been adopted: When a terminal moves from a cell to another cell, the base station instructs the terminal to change a radio channel in a hand-over, so that a carrier frequency can be switched to another one even during a call.

Japanese Patent Unexamined Publication No. H08-130766 discloses a transmission device and a reception device both of which are equipped with plural communicating sections corresponding to respective communication methods such as TDMA, CDMA, and FDMA. Those communication methods are allotted to respective time slots in one data frame to carry out a communication.

As discussed above, a transmission device and a reception device employed in a general radio transmitting system use a communication method such as a carrier frequency, a modulation method and a demodulation method as a standard. The conventional transmission and reception devices disclosed in the foregoing Japanese Patent Unexamined Publications H07-250116 and H08-130766 use plural methods of modulation and demodulation; however, combinations of a rate of error correcting code and a modulation/demodulation method are predetermined by a communicating section prepared. When communication quality lowers, a combination is selected appropriately to the transmission from among the combinations prepared.

In the case of the conventional transmission and reception devices which switch a carrier frequency to anther one, the carrier frequency can be changed within a range of the frequency band allotted to the radio transmitting system used by those devices. A type of the modulation method and demodulation method and a band of the carrier frequency to be used by those conventional transmission and reception devices are thus confined to specific ones.

This situation allows a third device, having the same function as the transmission and reception devices, other than the devices supposed to receive data from the device which transmits the data, to intercept the radio wave running through the radio propagation channel. The radio wave intercepted undergoes a signal conditioning or an analysis, so that a wiretapping is achievable.

DISCLOSURE OF THE INVENTION

The present invention aims to provide a transmission device and a reception device having a high secrecy making it difficult for a third device to intercept or wiretap a radio-wave.

The transmission device of the present invention comprises a modulation section (modulator) and a transmission section (transmitter). The modulator can modulate a signal by plural modulation methods. The transmitter can transmit a radio signal with plural carrier frequencies. The transmission device transmits data by changing a communication method following the lapse of time, the method formed by combining a modulation method and a carrier frequency. This construction allows allotting data divided to plural modulation methods and carrier frequencies and changing the methods and the frequencies with the lapse of time. As a result, it makes difficult for a third device to intercept the radio wave.

A transmission device of the present invention includes a switcher of transmission method, and has plural pieces of at least one of the modulator or the transmitter. The switcher switches the plural modulators or transmitters, thereby switching a communication method to be used by the transmitter. This construction allows the transmission device to switch a communication method to another one with ease.

A transmission device of the present invention transmits the data repeatedly without changing the communication method during a period in which another device is supposed to complete switching a reception communication method to the one formed by combining one of the modulation methods and one of the carrier frequencies corresponding to those of the transmission side in order to receive the data. This structure prevents that a transmission timing from shifting from a reception timing of another device. This timing shift causes the another device not to receive parts of the data or the whole data.

A transmission device of the present invention includes a transmission communication method notifying section and a communication receivable method reply receiver. The notifying section notifies another device, which is supposed to receive the data, of a communication method desirable to be used on the transmission side. The reply receiver receives a reply whether or not to receive the data by the communication method notified. The transmission device transmits data to the another device thereafter by the communication method accepted by this another device. This construction allows the transmission device to know which transmission method is actually workable among plural receivable modulation methods and carrier frequencies.

A transmission device of the present invention includes a data divider, which divides data into plural pieces of data and puts them numbers to identify its order in the original data. The lapse of time discussed previously indicates the lapse based on the order information. In other words, the transmission device transmits each piece of the data divided while changing the transmission communication methods. This construction allows restoring data, transmitted by plural communication methods and arriving at another device after various delays due to different transmission environments, into the original data transmitted from the transmission device.

A transmission device of the present invention includes a re-transmission request receiver. This receiver receives a request of re-transmitting missing parts of divided data from another device. Based on the request, the transmission device re-transmits the missing parts of the divided data. This construction allows improving communication quality by re-transmitting missing parts of divided data based on a request from another device. This is effective when this another device fails in receiving some parts of the divided data because a timing error occurs between transmission and reception in transmitting the divided data, or a propagation environment is lowered due to arrival of interfering wave. The foregoing construction thus improves communication quality by re-transmitting the missing parts of the divided data based on the re-transmission request.

A transmission device of the present invention receives, at its re-transmission request receiver, the re-transmission request together with information about at least one reception communication method available in another device. Then the transmission device re-transmits the missing pieces of data requested re-transmission by a communication method among the transmission communication methods corresponding to the communication methods available on the reception side. When the transmission device receives an acknowledgement from the another device of the missing piece of data re-transmitted based on the request, the transmission communication method used for successful re-transmission of the missing piece of data can be used thereafter.

When the another device fails in receiving parts of or the whole of divided data due to a deteriorated propagation path, this structure allows distinguishing a defective transmission communication method at the same time as re-transmitting divided data by communication methods available on the reception side and transmitted together with a re-transmission request to the transmission device. As a result, the quality of data communication thereafter can be improved.

A transmission device of the present invention comprises a demodulator and a receiver. The demodulator can demodulate data by plural demodulation methods. The receiver can receive a radio signal with plural carrier frequencies. A reception communication method formed by combining a demodulation method and a carrier frequency is changed following the lapse of time for receiving data. After a transmitter of the transmission device transmits data and the information indicating a communication method to be changed on the reception side, the receiver stands by for receiving information transmitted from another device in response to the information about the communication method to be changed.

This construction allows standing by for receiving information by a communication method desirable to be switched after the transmission device selects and transmits the reception communication methods to be changed one after another.

A transmission device of the present invention can transmit information indicating a communication method to be changed to on the reception side in an encrypted state. This structure allows preventing a third device from decrypting the communication method to be changed on the reception side.

A transmission device of the present invention includes an identifying mark to identify the transmission device, and uses the mark as a part of a key for encrypting. This structure allows preventing the third device that cannot know the identifying mark from decrypting a reception communication method.

A reception device of the present invention comprises a demodulator and a receiver. The demodulator can demodulate data by plural demodulation methods. The receiver can receive a radio signal with plural carrier frequencies. A reception communication method, formed by combining a demodulation method and a carrier frequency is changed following the lapse of time for receiving data. This construction allows receiving divided data by allotting individual data divided to the plural demodulation methods and carrier frequencies, and switching the methods and carrier frequencies one after another following the lapse of time. As a result, it becomes difficult for a third device to intercept the radio wave.

A reception device of the present invention includes a switcher of transmission method, and has plural pieces of at least one of the demodulator or the receiver. The switcher switches the plural demodulators or receivers, thereby switching the communication methods. This construction allows the reception device to switch a communication method to another one with ease.

A reception device of the present invention includes a transmission communication method receiver, a communication receivable method selector and a communication receivable method replying section. The receiver receives the transmission communication methods, which are notified from another device. The selector selects a communication receivable method from among the transmission side methods received. The replying section informs the another device of the selected communication receivable method. This construction allows the reception device, by informing the another device of the communication receivable method, to know which transmission method is actually workable among plural receivable modulation methods and carrier frequencies both to be used by the another device.

A reception device of the present invention receives the divided data at the receiver. The divided data include an order information which shows an order of each piece of divided data in the original data before divided, and each piece of the divided data is transmitted by changing a combination of a modulation method and a carrier frequency following the lapse of time. The reception device of the present invention includes a data restoring section which restores the divided data received at the receiver based on the order information.

This structure allows restoring the divided data into the original data before divided even if the divided data, received by plural communication methods at the reception device, arrive after different delays due to different propagation environments.

A reception device of the present invention includes a retransmission request transmitter which finds missing parts of divided data based on the order information added to each piece of the divided data received at the receiver, and requests the transmission device to re-transmit the missing parts. This is effective when another device fails in receiving parts of the divided data because a timing error occurs between transmission and reception in transmitting the divided data, or a propagation environment is lowered due to arrival of interfering wave. The foregoing construction thus improves communication quality by transmitting the request of re-transmitting the missing parts of the divided data.

If the reception device of the present invention still fails in receiving the missing parts of the divided data even it requests the transmission device to re-transmit the missing parts, the reception device requests the re-transmission by a transmission communication method corresponding to another receivable reception communication method.

This structure allows the reception device to receive data positively and improve data communication quality by using plural available communication methods on the transmission side in requesting the retransmission when the reception device fails in receiving the missing parts of the divided data.

The failure is caused by deterioration in transmission characteristics of the communication path of some communication method due to interfering wave or multi-path.

A reception device of the present invention includes an acknowledgement transmitter, which transmits the information about the reception communication method used in receiving successfully the missing parts of the divided data together with the acknowledgement. This structure allows informing the another device of not only the reception of the missing parts of the divided data but also the effective communication method. As a result, the data communication quality can be improved.

A reception device of the present invention includes a modulator and a transmitter. The modulator can modulate data by plural modulation methods. The transmitter can transmit a radio signal with plural carrier frequencies. When the receiver of the reception device receives data together with the information about a reception communication method, which another device desires to change, the transmitter of the reception device transmits information by switching a transmission communication method formed by combining a modulation method and a carrier frequency to the communication method corresponding to the reception communication method desired to change by the another device. This structure allows transmitting information by changing a transmission communication method one after another in response to a communication method desired to change by the another device.

A reception device of the present invention can receive information indicating a reception communication method desired to change in an encrypted state. This structure allows preventing the reception communication method desired to change from being decrypted by a third device.

A reception device of the present invention includes an identifying mark to identify the transmission device, and uses the mark as a part of a key for encrypting. This structure allows preventing the identifying mark which is not known by a third device from being decrypted by the third device.

The transmission device of the present invention comprises a modulator and a transmitter. The modulator can modulate data by plural modulation methods. The transmitter can transmit a radio signal with plural carrier frequencies. The transmission device can transmit data with different carrier frequencies simultaneously by plural transmission communication methods formed by combining a modulation method and a carrier frequency.

This structure makes it difficult for a third device, which is not able to know the details of communication methods simultaneously used by the transmission device, to intercept all the plural communication methods. As a result, a data transmission of high secrecy is achievable.

A transmission device of the present invention includes a transmission communication method notifying section and a communication receivable method reply receiver. The transmission device can transmit data with different carrier frequencies simultaneously by plural transmission communication methods formed by combining one of the modulation methods and one of the carrier frequencies to a destination, i.e. another device. In this case, not only the data but also communication methods desired by the transmission side are transmitted by the communication method notifying section. The communication receivable method reply receiver receives a reply of whether or not data can be received by the communication method notified. The transmission device transmits data thereafter to the another device by the communication method according to the reply from the another device.

The foregoing structure allows the another device, i.e. a destination of the data transmitted, to know an actually workable transmission communication method in a radio propagation environment between both the devices from among plural receivable modulation methods and carrier frequencies corresponding to plural transmission communication methods. Those methods are formed by combining modulation methods and carrier frequencies and transmit data simultaneously with different carrier frequencies. As a result, a communication by quality transmission is achievable.

A transmission device of the present invention includes a data divider, which divides data into plural pieces of data and puts each piece of data a number to identify its order in the original data. The plural pieces of data are transmitted with different carrier frequencies simultaneously by plural transmission communication methods to another device.

This structure allows restoring the data into the original data transmitted by the transmission device even if the data arrives at the another device after different delays due to different propagation environments.

A transmission device of the present invention includes a re-transmission request receiver, which receives a re-transmission request of missing parts of the divided data from another device by plural communication methods formed by combining a transmission side modulation method and a carrier frequency. Meanwhile the plural methods transmit data with different carrier frequencies simultaneously. The transmission device re-transmits the missing piece of data based on the request of re-transmission.

This structure allows re-transmitting the missing piece of the divided data based on the request of re-transmission requested by the another device, so that communication quality can be improved. This is effective when the another device fails in receiving parts of the divided data because a timing error occurs between transmission and reception in transmitting divided data, or a propagation environment is lowered due to arrival of interfering wave.

A transmission device of the present invention receives available communication methods on the reception side, at its re-transmission request receiver, together with the re-transmission request by plural transmission communication methods. Meanwhile the plural methods are formed by combining a modulation method and a carrier frequency and transmit data with different carrier frequencies simultaneously. The transmission device then re-transmits the requested data by using an available method among the communication methods corresponding to the communication methods available on the reception side. When the transmission device receives an acknowledgement from another device of the data re-transmitted to the another device, a transmission communication method used for this successful re-transmission of the divided data can be used thereafter.

When the another device fails in receiving parts of or the whole of the divided data due to a deteriorated propagation path, using the foregoing plural transmission communication methods, this structure allows distinguishing a defective transmission communication method as well as re-transmitting the divided data by communication methods available on the reception side transmitted to the transmission device together with a retransmission request. As a result, the quality of data communication thereafter can be improved.

A transmission device of the present invention includes a change notifying section, which notifies by one of the plural methods its partner of a request for changing a communication method to another one of plural transmission communication methods together with the method to be used after the change. Which communication method is used by the notifying section as a transmission means for change notice is shared only between the transmission device and its counterpart.

This structure makes it difficult for a third device to know which signal among plural signals originated from the transmission device includes a change request for changing to a communication method to another one together with the method after the change. The third device thus cannot follow the change of the communication method or intercept signals. As a result, the secrecy of communication can be improved.

A transmission device of the present invention notifies its counterpart of a change request and a communication method to be used on the transmission side by using its change notifying section. After this, data transmitted by at least one but not all of the transmission communication methods are invalid data not necessarily to be transmitted to other devices. This structure makes it difficult for the third device to know which is true data and which is invalid data even if it can simultaneously receive and interpret all the data transmitted by plural transmitters. As a result, it becomes difficult to intercept data transmitted.

A reception device of the present invention includes a demodulator and a receiver. The demodulator can demodulate data by plural demodulation methods. The receiver can receive a radio signal with plural carrier frequencies. Plural transmission communication methods formed by combining a demodulation method and a carrier frequency transmit data simultaneously with different carrier frequencies. The reception device receives the data by a communication method corresponding to the method used on the transmission side.

This construction makes it difficult for a third device, which is not able to know in advance all the contents transmitted by the plural communication methods, to receive simultaneously all the transmission communication methods. As a result, a communication of high secrecy can is achievable.

A reception device of the present invention includes a communication method receiver, a communication receivable method selector, and a communication receivable method replying section. Plural transmission communication methods formed by combining a demodulation method and a carrier frequency transmit data simultaneously with different carrier frequencies. The reception device receives the data by communication methods corresponding to the transmission communication methods. The communication method receiver receives a communication method notified as a desirable method to use by another device, i.e. the device has originally transmitted the data. The communication receivable method selector selects a communication receivable method from among the desirable methods received at the communication method receiver. The receivable method replying section informs the another device of the receivable method selected.

This construction allows the reception device, by informing the another device of the communication receivable method, to know which transmission method is actually workable among plural receivable modulation methods and carrier frequencies both desirable to be used by the another device.

A reception device of the present invention includes a data restoring section. Plural transmission communication methods, formed by combining a demodulation method and a carrier frequency, transmit data simultaneously with different carrier frequencies. The reception device receives the data by communication methods corresponding to the methods used by the transmission device. Original data are divided into pieces of data (divided data) and each piece of data is put a number to identify its order in the original data. The reception device receives the divided data, transmitted by changing a combination of a modulation method and a carrier frequency, at its receiver. The data restoring section restores the divided data into the original data based on the order information.

This structure allows restoring the divided data into the original data before divided, even if the divided data, received by plural communication methods at the reception device, arrive after different delays due to different propagation environments.

A reception device of the present invention includes a re-transmission request transmitter. Plural transmission communication methods, formed by combining a demodulation method and a carrier frequency, transmit data simultaneously with different carrier frequencies. The reception device receives the data by communication methods corresponding to the methods used by the transmission device, then determines missing parts of the divided data based on the order information added to each piece of the divided data. The transmitter transmits a request of re-transmitting the missing parts.

This is effective when another device fails in receiving parts of the divided data because a timing error occurs between transmission and reception in transmitting divided data, or a propagation environment is lowered due to arrival of interfering wave. The foregoing construction thus improves communication quality by transmitting the request of re-transmitting the missing pieces of the divided data.

A reception device of the present invention receives data by reception communication methods corresponding to the transmission communication methods discussed below. The data have been transmitted by the plural transmission communication methods, formed by combining a demodulation method and a carrier frequency, transmit data simultaneously with different carrier frequencies. When the reception device is not able to receive the missing parts of the data even after requesting a re-transmission of the missing parts, the re-transmission request transmitter transmits a presently available reception communication method together with the re-transmission request.

This structure allows another device to re-transmit the missing parts of the data by using the presently available plural transmission communication methods. This is effective when the reception device fails in receiving the missing parts of data after repeated re-transmission requests or waiting the missing parts of data in a predetermined time. Because an interfering wave or multi-path affects transmission characteristics of a communication path used by some communication methods to deteriorate. As a result, the missing parts of data can be positively obtained and communication quality can be improved.

A reception device of the present invention includes an acknowledgement transmitter. Plural communication methods, on the transmission side, formed by combining a demodulation method and a carrier frequency transmit data simultaneously with different carrier frequencies. The reception device receives the data by reception communication methods corresponding to the methods used by the transmission device. When the reception device successfully receives the missing parts of the divided data, the acknowledgement transmitter transmits information about the communication method used at the successful reception together with the acknowledgement.

This structure allows notifying another device of not only the acknowledgement of the missing parts of the data but also an effective reception communication method. As a result, data communication quality can be improved.

A reception device of the present invention includes a change notifying section, which receives a notice of a request, by one of the plural transmission communication methods, for changing a communication method to another one of plural transmission communication methods together with the method to be used after the change. The reception device receives data based on the change request received and the communication method to be used after the change.

This structure makes it difficult for a third device to find which signal among plural signals received by the reception device includes a request of changing a communication method to another one together with a communication method to be used after the change. As a result, the secrecy of communication can be improved.

A reception device of the present invention receives at its change notifying section the change request together with a communication method to be used after the change, then its receiver disposes of data transmitted by a transmission communication method as invalid data unnecessary to receive. This structure makes it difficult for a third device to determine which is true data and which is invalid data from among data received by plural receivers. The third device is thus forced to receive and interpret all the data simultaneously, so that an interception of data becomes difficult.

DETAILED DESCRIPTION OF PREFERRED EMBODIMENTS

A transmission device and a reception device in accordance with exemplary embodiments of the present invention are demonstrated hereinafter with reference to the accompanying drawings.

Exemplary Embodiment 1

The first exemplary embodiment of the present invention is demonstrated hereinafter with reference to FIG. 1, which shows a block diagram of a radio transmitting system including a transmission device (or transmission radio device) and a reception device (or reception radio device) in accordance with a first exemplary embodiment of the present invention.

Figure 1:
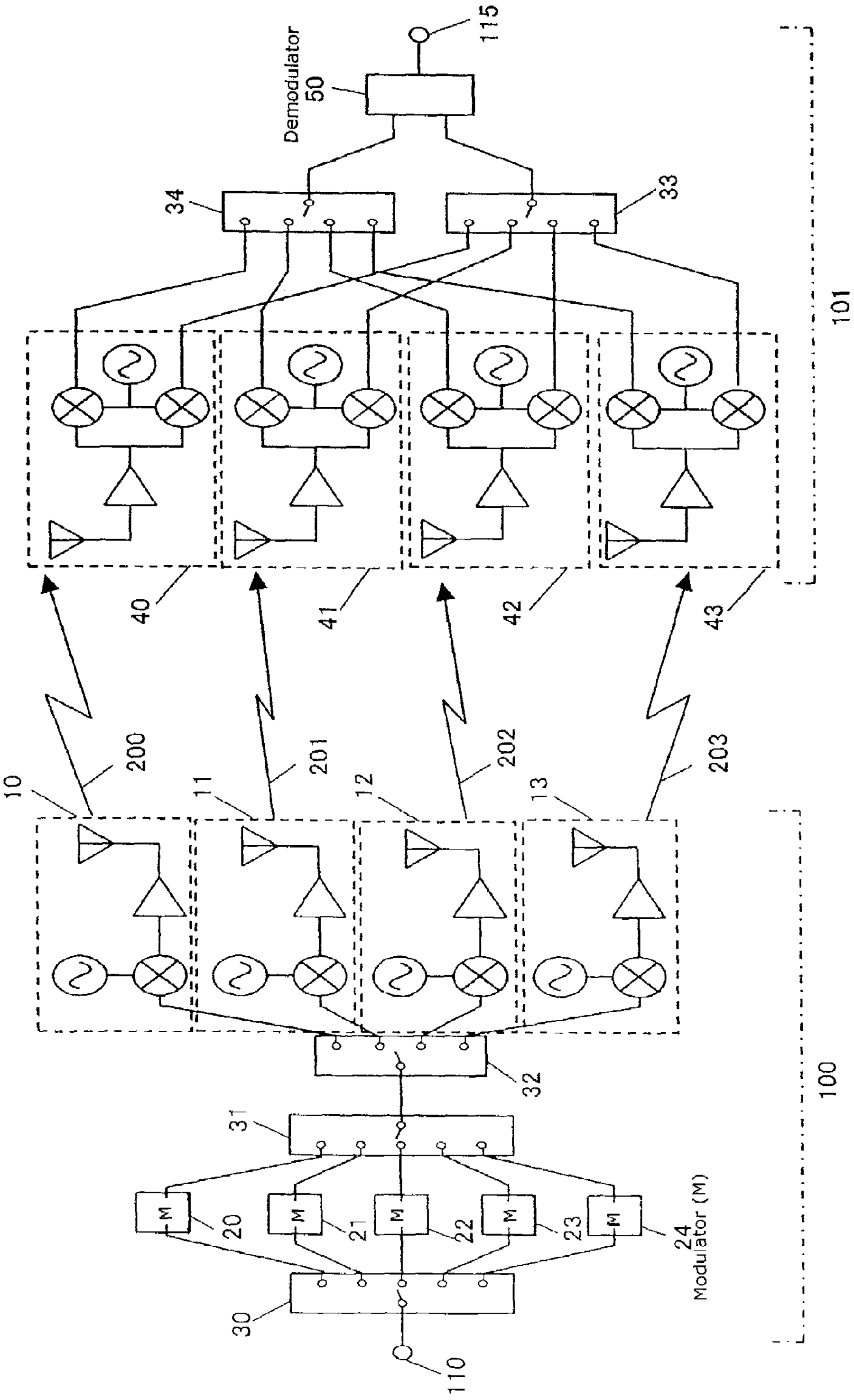
FIG. 1 shows a block diagram illustrating a radio transmitting system including a transmission device and a reception device in accordance with a first exemplary embodiment of the present invention.

Transmission radio device 100 shown in FIG. 1 comprises the following elements:

- radio transmitter 10-13 that can transmit data with plural carrier frequencies;
- modulators 20-24 that modulate a data signal by plural methods, the data signal supplied from transmission data input terminal 110; and
- method switchers 30-32 that switch transmitters 10-13 and modulators 20-24 one after another.

Reception radio device 101 comprises the following elements:

- radio receivers 40-43 that can receive data with plural carrier frequencies;
- demodulator 50 that can demodulate data by plural methods; and
- method switchers 33 and 34 that switch a connection between receivers 40-43 and demodulator 50 one after another.

Reception radio device 101 outputs data transmitted to transmission data output terminal 115.

Transmission radio device 100 and reception radio device 101 form the radio transmitting system in accordance with the first exemplary embodiment of the present invention.

Transmission radio device 100 shown here has a structure applicable to five modulation methods and four carrier frequency bands. Method switchers 30 and 31 select a modulator from among modulators 20-24, and method switcher 32 selects one transmitter from among transmitters 10-13, namely, selects one carrier frequency band to be used for transmission. A frequency synthesizer disposed to transmitters 10-13 can select plural carrier frequencies at respective carrier frequency bands, so that a large number of transmission communication methods, i.e. numerous combinations of modulation methods and carrier frequencies, are available.

Radio transmitters 10-13 can transmit data through propagation path 200 with carrier frequency fA, propagation path 201 with carrier frequency fB, path 202 with frequency fC, and path 203 with frequency fD respectively. Each one of the radio transmitters comprises a local oscillator, an up converter, a power amplifier, and an antenna. A radio section that processes a signal of a carrier frequency band is formed, in general, of an analog high-frequency circuit. It is thus difficult for a radio device to obtain excellent characteristics because of the trade-off between a wider range operation and a lower gain of the circuit as well as greater noises.

Because of the foregoing reason, a high frequency circuit of each one of radio transmitters 10-13 undergoes a circuit optimization so that characteristics become optimum at its carrier frequency band. To be more specific, the following optimizations are carried out: phase noises are reduced at the local oscillator by narrowing a band of the oscillator, impedance matching at circuit connections, optimizations at bias of active circuits such as the up converter and the power amplifier, and optimization of transistors at their types or sizes. A filter can be used for reducing noises such as interference radiation of the transmitter.

Modulators 20-24 are placed in parallel to each other that can modulate data by a modulation method different from each other. The following modulation methods can be available: analog modulations including amplitude modulation (AM), phase modulation (PM), and frequency modulation (FM), and digital modulations including amplitude shift keying (ASK), phase shift keying (PSK), and frequency shift keying (FSK). In addition to the foregoing methods, quadrature amplitude modulation (QAM), spectrum diffusion, orthogonal frequency division multiplex (OFDM) are available.

Each method has modulation parameters such as a modulation exponent, a bandwidth of a band limit filter, the number of sub-carriers, and those parameters can provide a modulation signal with variation. The digital modulation, in particular, can carry out this variation by using digital signal processor (DSP) at modulators 20-24. As an embodiment, one DSP including plural modulators 20-24 can select various communication methods on the reception side.

Method switchers 30-32 execute a combination of plural modulation methods and plural carrier frequencies, and the switchers are used in the form shown in FIG. 1. Modulators 20-24 shown in FIG. 1 produce an intermediate frequency (IF) modulated by data supplied from input terminal 110, and FIG. 1 shows an instance of the IF being transmitted by method switchers 31, 32 to plural radio transmitters 10-13.

Reception radio device 101 has radio receivers 40-43 so that four types of carrier frequencies can be received, and receivers 40-43 receive signals passing through propagation paths 200-203. Demodulator 50 coupled to receivers 40-43 via method switchers 33, 34 restore the data transmitted, then outputs the data to output terminal 115.

Each one of radio receivers 40-43 comprises an antenna, a local oscillator, a low noise amplifier, and a down converter. The receivers have undergone circuit-optimization such that receiver 40 can receive data with carrier frequency fA, receiver 41 at fB, receiver 42 at fC, and receiver 43 at fD. A filter (not shown) can be sometimes used for attenuating frequency-bands other than the carrier frequency bands to be received in order to eliminating interfering waves.

FIG. 1 shows a structure that deals with a signal in the following way: A signal is digitally modulated by receivers 40-43, and the signal undergoes quadrature-demodulation at the two down converters, namely, the signal is demodulated into quadrature base-band signal formed of I component and Q component. The respective components of the quadrature base-band signal are transmitted to demodulator 50 via method switchers 33, 34. Demodulator 50 can demodulate signals having undergone the modulations provided by modulators 20-24, and output the data restored to output terminal 115.

In this embodiment, transmission radio device 100 synchronizes timewise and switches method switchers 30, 31 (first method switcher), thereby changing modulators 20-24 timewise, then switcher 32 (second method switcher) switches timewise radio transmitters 10-13 to be selected. As a result, data can be transmitted by plural transmission communication methods (also referred to as a transmission method). The data is transmitted through propagation paths 200-203 to reception radio device 101.

Reception radio device 101 is equipped in advance with radio receivers 40-43 and demodulator 50 which carry out a reception communication method (referred to as a transmission method same as on the transmission side) corresponding to that (transmission method) to be used on the transmission side. Receivers 40-43 receive radio signals running through paths 200-203 respectively, and synchronizes and switches method switchers 33, 34 (third method switcher), thereby transmitting the signals one by one to demodulator 50 for demodulation.

This first exemplary embodiment proves the following advantage: A third device (also referred to as a third party) other than transmission radio device 100 or reception radio device 101 cannot receive a radio communication by tuning itself to the radio wave when the third device cannot know in advance the transmission method to be used between devices 101 and 102, or cannot be equipped with a reception radio device accommodating itself to the transmission method to be used by transmission device 100.

Intervals between respective carrier frequencies fA-fD passing through propagation paths 200-203 are widened so that a wide range frequency band can be used. This preparation makes it difficult to build a third device intercepting the radio wave. A radio apparatus to be used in a radio system generally used receives a signal in a rather narrow frequency range. Because its antenna gain, filter comparison band, and oscillating frequency range of an oscillator are designed such that the reception characteristics can be optimized at a frequency band to be used by the radio system.

The plural carrier frequencies used in this embodiment are not limited to be used only by a conventional radio system, but also used by different plural radio systems that use different frequencies. Or a frequency which has not been used by a conventional radio system can be used. The foregoing availability of frequencies makes it difficult for a radio apparatus adapting itself to a conventional radio transmitting system using a single frequency to intercept the radio wave.

As discussed above, when method switchers 30-34 switches timewise a transmission method and then transmits data, it can happen that reception device 101 is not able to receive parts of or whole of the data transmitted due to differences in transmission delays of propagation paths or in timing of switching a method.

In such a case, reception device 101 receives data by switching method switchers 33, 34 timewise, and transmission device 100 keeps transmitting the same data repeatedly without switching method switchers 30-32 at least while reception device 101 switches every transmission method for reception. This mechanism allows reception device 101 to obtain chances for receiving data by the transmission method used by transmission device 100, so that the data can be positively transmitted and received.

As transmission radio device 100 takes more time for transmitting data, the transmission rate lowers; however, reliability of data transmission can be increased. Further, both of transmission device 100 and reception device 101 are equipped with both of the transmission and reception functions, then when reception device 101 receives data successfully, device 101 transmits an acknowledgement, i.e. the successful reception, to transmission device 100. This structure allows transmission device 100 to switch a transmission method in a shorter time, so that transmission device 100 can transmit different data more quickly.

As discussed above, the first exemplary embodiment achieves a radio transmitting system that includes a transmission device and a reception device, and which system makes it difficult for a third party other than the transmitter or the receiver to intercept the communication. The radio transmitting system switches plural modulation and demodulation methods and plural carrier frequencies timewise for transmitting and receiving data.

In this embodiment, five methods of modulation and demodulation and four carrier frequencies are used as an instance; however, each section of the devices are not limited to use this number of methods and frequencies. The radio transmitter and the radio receiver can transmit or receive data with respective carrier frequencies because a frequency synthesizer used as the local oscillator allows transmitting and receiving data with plural carrier frequency channels at each one of the carrier frequency bands. Thus a large number of combinations are available. The radio transmitter employs the heterodyne method and the radio receiver employs the direct conversion method in this embodiment; however, the transmitter and the receiver are not limited to this instance.

A modulation method and a carrier frequency can be changed independently, or one of them can be fixed sometimes, or both of the method and the frequency can be varied without fail while data is transmitted or received. A transmission method can be changed such as transmitting data at a constant cycle, e.g. transmitting data in a unit of data divided, or transmitting data at random intervals.

Exemplary Embodiment 2

Figure 2:
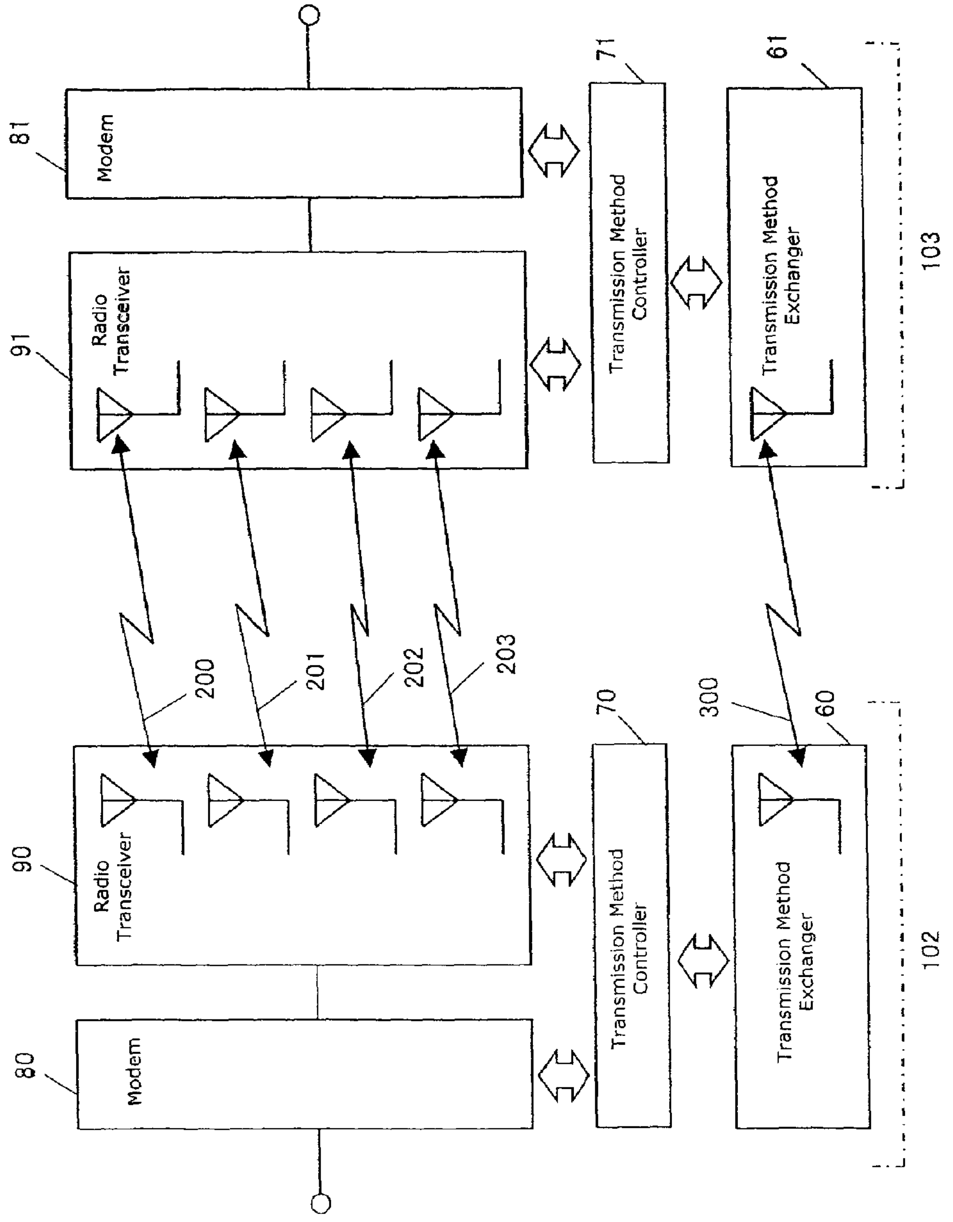
FIG. 2 shows a block diagram illustrating a radio transmitting system including a transmission device and a reception device in accordance with a second exemplary embodiment of the present invention.

The second exemplary embodiment of the present invention is demonstrated hereinafter with reference to FIG. 2, which shows a block diagram of a radio transmitting system including a transmission device and a reception device in accordance with the second embodiment. The system shown in FIG. 2 differs from that shown in FIG. 1 in the following points: Radio apparatuses 102 and 103 are formed of modems 80, 81 adapting themselves to plural modulation methods or demodulation methods, and radio transceivers 90, 91 that can transmit data with plural carrier frequencies. Radio apparatuses 102 and 103 are thus equipped with the functions of both of the transmission and reception devices. Radio apparatuses 102 and 103 are equipped with transmission method exchangers 60, 61 and transmission method controllers 70, 71 respectively.

An operation of this system is demonstrated hereinafter. Basically, it operates in a similar way to the radio transmitting system, including the transmission device and the reception device, described in the first embodiment. A procedure of determining a transmission method to be used for a radio transmission between radio apparatuses 102 and 103 is demonstrated hereinafter.

First, upon a request of starting a data communication, radio apparatus 102, which is going to transmit data, informs radio apparatus 103 of available transmission methods known by transmission method controller 70 via transmission method exchanger 60. Between transmission method exchangers 60 and 61, propagation path 300 is available, and control information and others are transmitted by a transmission method determined in advance between radio apparatuses 102 and 103.

Radio apparatus 103 always monitors propagation path 300 by using transmission method exchanger 61, and when receiving a request of starting a data communication and information about transmission methods available to radio apparatus 102, radio apparatus 103 transmits the content thereof to transmission method controller 71. Controller 71 compares transmission methods available to itself with the information about the methods available to apparatus 102, and finds plural methods available to both of apparatuses 102 and 103 as common transmission methods. If radio apparatus 103 accepts the request of starting a data communication, it replies the acceptance to apparatus 102 using all the common transmission methods.

After requesting a start of data communication, radio apparatus 102 waits for a reply by transmission methods available to itself, namely, all the methods notified to apparatus 103. When apparatus 102 receives the reply, transmission method controller 70 determines that the method used for the reply is an effective transmission method. Then apparatus 102 carries out a data communication thereafter only by this effective method.

Transmission quality of a data communication deteriorates due to an environment of radio wave propagation such as multi-path, or interfering waves from other radio apparatuses. Magnitude of those factors vary depending on transmission methods including carrier frequencies or mod/demod methods. This second embodiment allows distinguishing transmission methods of poor quality from among the plural methods available between apparatuses 102 and 103, so that the methods of poor quality can be avoided in advance.

During a data communication, the transmission quality can be sequentially monitored in the procedure using transmission method exchangers 60, 61, and if the quality becomes poor, the method can be changed to another one of good quality.

When a large number of common transmission methods are available to both apparatuses 102 and 103, it takes a time for apparatus 103 to give a reply to apparatus 102 by all the common methods, so that some idea for shortening the time is needed. To overcome this problem, when radio apparatus 102, which has requested a start of data communication, notifies apparatus 103 of available transmission methods, apparatus 102 had better specifies a transmission method by which apparatus 103 gives a reply to apparatus 102. Then radio apparatus 102 just waits for the reply by the specified method. It is desirable to specify a transmission method in which a carrier frequency is set a wider range, and general dependency of propagation environment on frequency can be known.

As discussed above, when radio apparatus 103 notifies apparatus 102 of available transmission methods, apparatus 103 gives a reply to apparatus 102 by all the common transmission methods. This case allows knowing the reply together with the transmission quality. However, when apparatus 102 specifies a transmission method for apparatus 103 to use for the reply, it is impossible to know all the common transmission methods.

To overcome this problem, when radio apparatus 103 gives a reply, apparatus 103 notifies apparatus 102 of the information about all the common transmission methods by a method specified by radio receivers 90, 91 and modems 80, 81, or by transmission method exchangers 60, 61. Apparatus 103 gives a reply to apparatus 102 by transmitting information about all the common methods instead of using all the common methods. This method is not limited to the case when apparatus 102 specifies a transmission method, but the method can be used when apparatus 103 notifies apparatus 102 of the common transmission methods.

As discussed above, the information about the common transmission methods is exchanged between the transmission side and the reception side. In such a case, apparatus 103 compares the transmission methods available to itself with the available methods notified by apparatus 102, then gives a reply to apparatus 102 that methods available to both apparatuses 102 and 103 are used as common transmission methods.

An example of a method of expressing the information about common transmission methods is this: express mod/demod methods in a line and carrier frequencies in a row, namely, express them as a matrix, then mark a combination usable. Mod/demod methods include QPSK, QAM, and secondary modulation such as QFDM and spectrum diffusion modulation method. Those can be combined into methods usable in radio transmission, and numbers are assigned to those methods to be controlled with ease.

A carrier frequency is specified by a center frequency and a bandwidth into a radio frequency channel. Numbers are assigned to those channels to be controlled. The radio frequency channel includes the frequency channels specified by the radio systems standardized such as the cellular system or the radio LAN system. In other words, a channel number of the radio frequency channel specifies a center frequency and a radio system to be used, so that a bandwidth available is also determined.

A large number of combinations of mod/demod methods and carrier frequencies specified can be expected; however, the major portion of those combinations are not available to the general public because they are occupied by radio regulations or radio system standards. Thus combinations only available to general public users can be handled as information to be controlled. Plural radio frequency channels belong to similar radio systems can be grouped for simple control. When a radio device can use a radio system, then mark the group number corresponding to the radio system, so that available systems can be known with ease.

The foregoing matrix has binary information, i.e. available or not available; however, the matrix can have information about weighing a preferable combination to be used, and plural transmission methods can be selected referring to this weighing information. The matrix information discussed above is exchanged between radio apparatuses, so that the information about the common transmission methods available to both the apparatuses can be shared by the transmission side and the reception side.

In this embodiment, combinations of mod/demod methods and carrier frequencies are expressed in a matrix, however, data control is not limited to the use of matrix. Respective carrier frequencies simultaneously transmitted can use the modulation methods different from each other.

Transmission method exchangers 60, 61 work as means for transmitting control information; however, exchangers 60, 61 can be used for data transmission. In other words, exchangers 60, 61 shown in FIG. 2 can be mounted as parts of radio transmitters 90, 91 and modems 80, 81. Since exchangers 60, 61 use predetermined carrier frequency fX and mod/demod method, it can happen that a third device can intercept the communication; however, this problem can be overcome by not transmitting data through propagation path 300 after an effective transmission method is determined.

Radio apparatuses 102 and 103 can have plural processing systems in parallel at radio receivers 90, 91 and modems 80, 81 for dealing with plural transmission methods simultaneously instead of having a method switcher shown in the first embodiment for switching transmission methods timewise. In this case, assume that the both cases handle the same number of transmission methods, a circuit size becomes larger than the case where the method switcher is used; however, use of the plural transmission methods allows transmitting or receiving data simultaneously.

As discussed above, the second embodiment achieves that plural transmission methods formed by combining plural mod/demod methods and carrier frequencies are switched timewise for transmission and reception. The second embodiment also achieves a radio system, including a transmission device and a reception device, which transmit or receive data by plural transmission methods simultaneously. In this system, both the devices show the information about transmission methods available to themselves respectively, so that both the devices can share the information about transmission methods available to both the devices. A transmission method of poor transmission quality can be distinguished in advance, so that better transmission quality is obtainable.

Exemplary Embodiment 3

Figure 3:
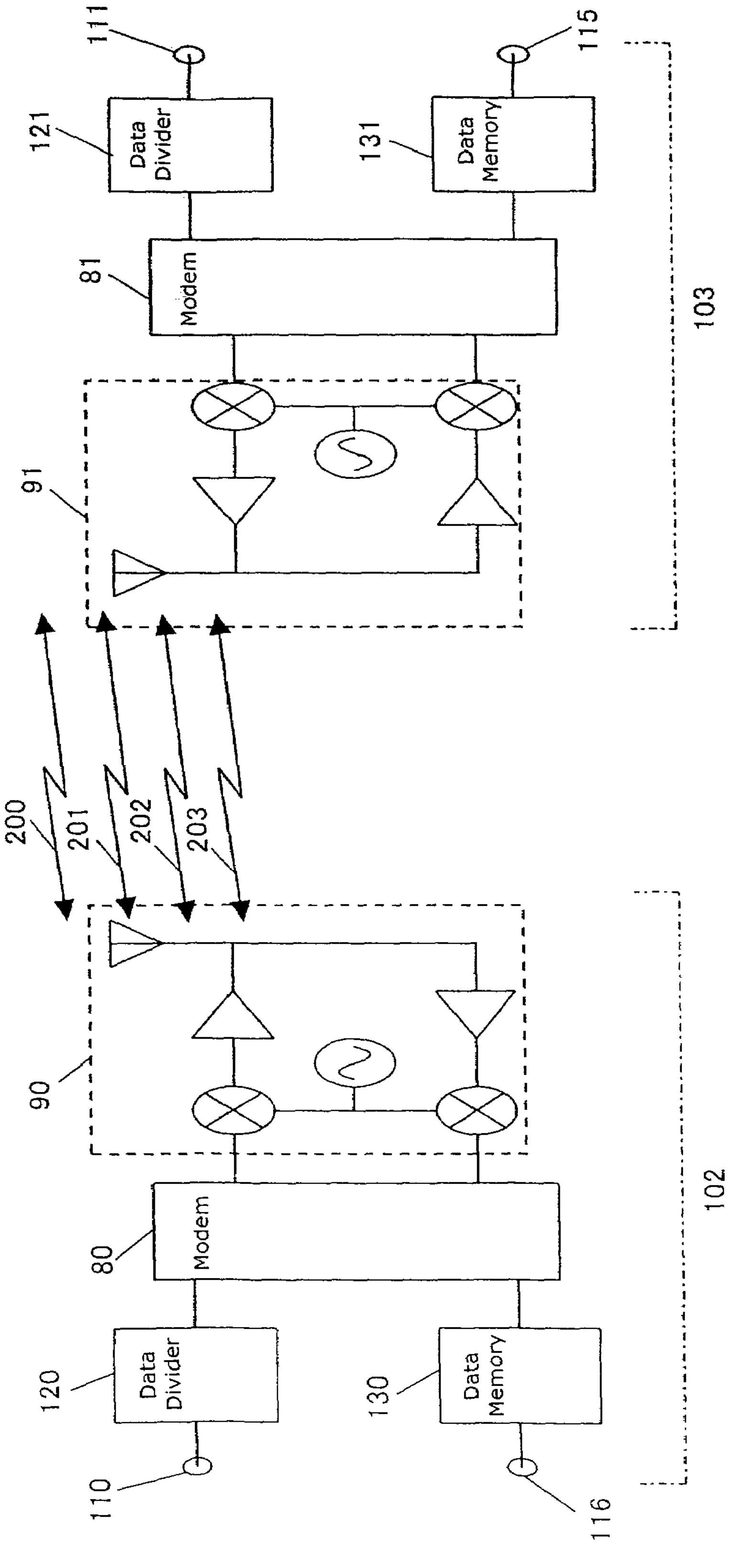
FIG. 3 shows a block diagram illustrating a radio transmitting system including a transmission device and a reception device in accordance with a third exemplary embodiment of the present invention.

The third exemplary embodiment of the present invention is demonstrated hereinafter with reference to FIGS. 3 and 4. FIG. 3 shows a block diagram illustrating a radio transmitting system including a transmission device and a reception device in accordance with this third embodiment. FIG. 3 differs from FIG. 2 in the following points: In radio apparatuses 102, 103 having transmission and reception functions, data input terminal 110, 111 are coupled to data divider 120, 121, and data output terminals 115, 116 are coupled to data memories 130, 131. Radio transceivers 90, 91 have only one system of processing a signal in a carrier frequency band.

Figure 4:
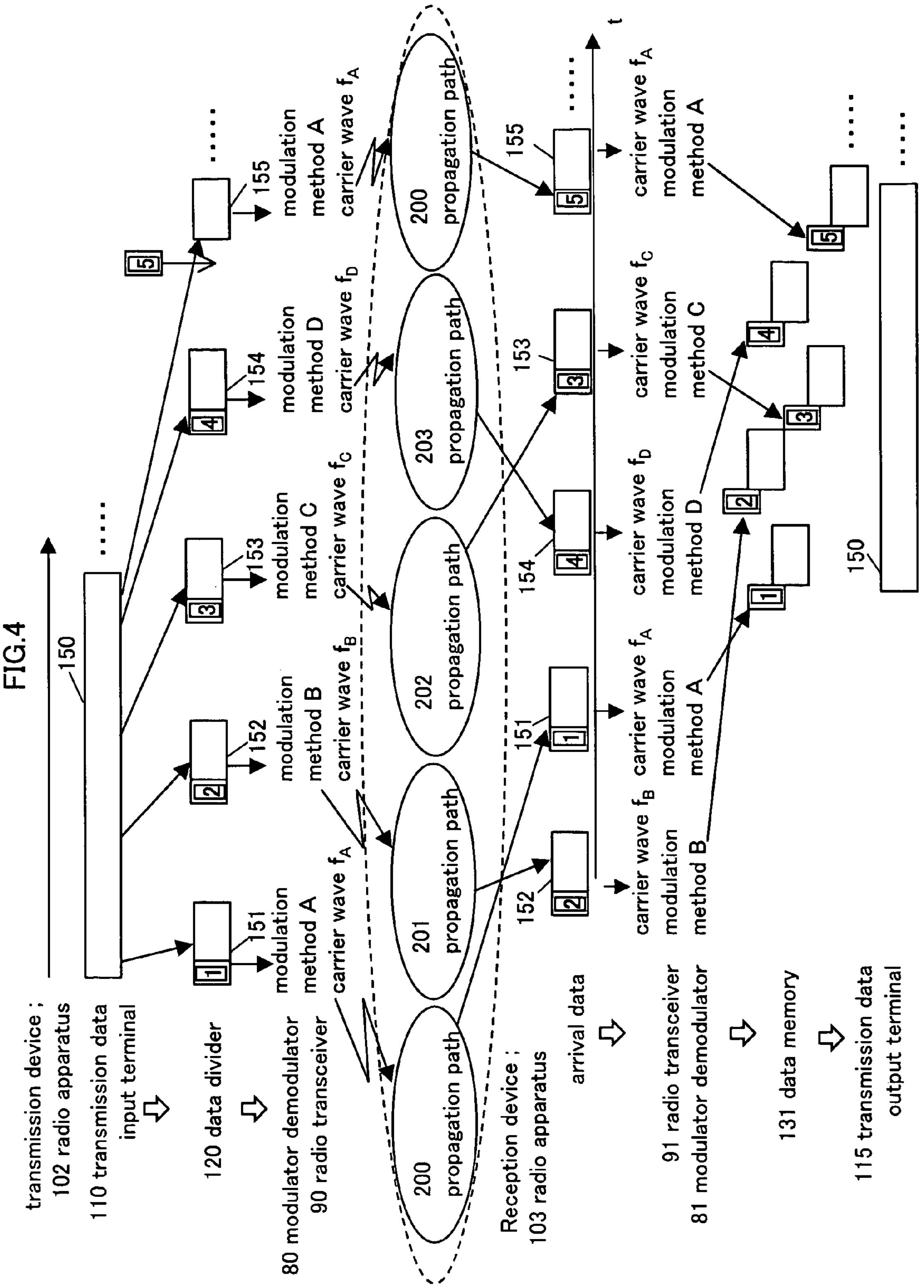
FIG. 4 shows a schematic diagram illustrating a data flow in the radio transmitting system including a transmission device and a reception device in accordance with the third exemplary embodiment of the present invention.

FIG. 4 shows a data transmission flow in the radio transmitting system including the transmission device and the reception device in accordance with the third embodiment. The upper section shows data processing by radio apparatus 102 on the transmission side and the lower section shows data processing by radio apparatus 103 on the reception side.

An operation of this system is demonstrated with radio apparatus 102 on the transmission side and radio apparatus 103 on the reception side. The system operates basically in a similar way to the radio transmitting system demonstrated in the first and second embodiments. In this third embodiment, data 150 to be transmitted is supplied to input terminal 110, and divided into data 151-data 155 by data divider 120, and a number is put to each piece of data 151-155 for identifying its order in the original data. Then data 151-155 are transferred to modem 80. Modem 80 and transceiver 90 vary a modulation method and a carrier frequency for each piece of data 151-155, thereby modulating each piece of data 151-155 and transmitting them.

Data 151-155 divided by data divider 120 into pieces of data are similar to packet data, and the number put each piece of data is similar to a packet header. This third embodiment thus transmits data in packets with a modulation method and a carrier frequency varying. FIG. 4 shows an instance where four transmission methods formed by combining a modulation method and a carrier frequency are used. Each piece of data divided and having a number for identifying its order in the original data is transmitted with a transmission method changing one by one.

Propagation paths 200-203 used for transmission have different propagation delays from each other due to a frequency used by each path, so that each piece of data arrives at radio apparatus 103 after a delay different from each other. As a result, the order of data received and demodulated sometimes does not agree with the order of the original data.

To prevent this possible problem, radio apparatus 103 receives data at radio transceiver 91 and modem 81 using the plural transmission methods that have been used by radio apparatus 102, and stores each piece of data 151-155 received and demodulated. Radio apparatus 103 then rearrange the data stored according to the order numbers put to each piece of data 151-155, and outputs data 150 from data output terminal 115. As a result, the data are restored to the original data transmitted from radio apparatus 102.

FIG. 3 shows a structure where transceivers 90, 91 have only one system for processing a signal in a carrier frequency band. This one system can be formed of a radio circuit including an oscillator that allows processing a signal in plural carrier frequency bands to be used, a frequency converter, an amplifier, and an antenna. The structure shown in FIG. 3 has modems 80, 81. Each one of those modems can be formed of a base-band signal processing circuit including a digital signal processor and a converter of analog signal to/from digital signal.

Those signal processors at front-end have been commercialized by techniques which have developed software radio devices. An application of such a software radio device allows obtaining the radio transmitting system including a transmission device and a reception device of the present invention.

As discussed above, according to this third embodiment, plural transmission methods formed by combining plural mod/demod methods and plural carrier frequency bands are switched timewise, thereby transmitting and receiving data. In a radio transmission method including a transmission device and a reception device which transmits and receives data by plural transmission methods, excellent transmission quality can be obtained even if a transmission delay of each one of propagation paths differs from each other due to a transmission method.

The radio transceiver used in this embodiment can be formed by installing plural systems in parallel for processing signals in the respective carrier frequency bands. This formation produces an advantage similar to what is discussed above. A change of a communication method can be done to each piece of data divided, or for a unit formed of plural pieces of data divided.

Exemplary Embodiment 4

Figure 5:
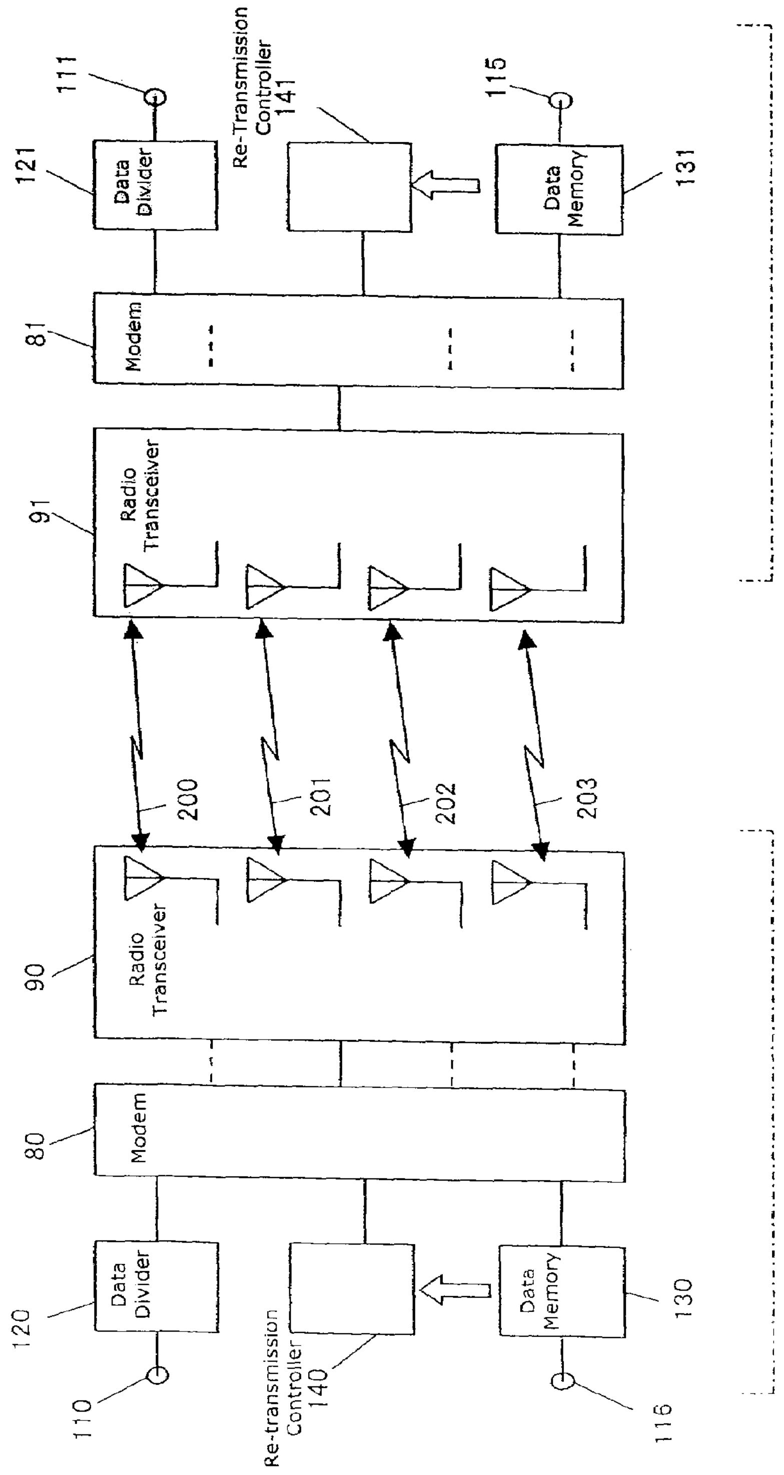
FIG. 5 shows a block diagram illustrating a radio transmitting system including a transmission device and a reception device in accordance with a fourth exemplary embodiment of the present invention.

The fourth exemplary embodiment of the present invention is demonstrated hereinafter with reference to FIG. 5, which shows a block diagram illustrating a radio transmitting system including a transmission device and a reception device in accordance with the fourth embodiment. FIG. 5 differs from FIG. 3 in the following points: Radio transceivers 90, 91 are illustrated as plural signal processing systems. Re-transmission controllers 140, 141 are newly equipped to the system for requesting a re-transmission of data when the system fails in receiving the data.

An operation of this radio transmitting system is demonstrated hereinafter. The system basically operates in a similar way to the system including the transmission device and the reception device demonstrated in the third embodiment.

This fourth embodiment proves an improvement in transmission quality by the following methods. When radio apparatus 103 supposed to receive data fails in receiving parts of the data due to the following reasons: fading caused by moving of radio apparatuses 102, 103, or a timing gap between data arrival from propagation paths 200-203 and the reception/demodulation. In such a case, the missing data is detected at data memory 131 from the numbers put to each piece of data received and demodulated. Then re-transmission controller 141 requests re-transmitting the data to apparatus 102 by using the transmission method successfully receiving the data, so that transmission quality can be improved.

In the case when radio receiver 103 cannot receive the missing data although it has requested re-transmission several times and waits for a given time, it is presumed that quality of parts of the transmission method presently used deteriorates, so that the data cannot be transmitted. Thus re-transmission controller 141 of radio apparatus 103 on the reception side requests the re-transmission of the missing data to radio apparatus 102 by all the transmission methods available, i.e. every combination of mod/demod methods and carrier frequencies available. Communication quality is thus expected to improve.

Radio apparatus 103 on the reception side informs radio apparatus 102 from its re-transmission controller 141 of a re-transmission request together with the information about transmission methods available on the reception side by a transmission method of good quality. Then radio apparatus 102 re-transmits the missing data by all the transmission methods available to itself among the transmission methods available to the reception side. Using all the transmission methods available on the reception side, radio apparatus 103 tries to receive the data re-transmitted from apparatus 102, thereby knowing which methods successfully receive the data re-transmitted. As a result, apparatus 103 knows which transmission methods can be used at that time.

Radio apparatus 103 then informs apparatus 102 of the acknowledgement and the transmission methods successfully receiving the re-transmission by the method usable. Thereafter, both apparatuses 102 and 103 use only the usable method for data transmission, so that errors in communication due to defective transmission methods. As a result, communication quality can be improved. The information such as a re-transmission request, an acknowledgement, and transmission methods available exchanged between apparatus 102 and apparatus 103 can be exchanged by the transmission method exchangers described in the second embodiment and shown in FIG. 2.

In the case when radio apparatuses 102 and 103 carry out a data communication by using plural transmission methods, they can judge the quality of their transmission methods respectively by the following methods: (a) measure a reception electric field strength of a data signal received, or (b) transmit known data between apparatuses 102 and 103 and measure an error rate of the data. Then a heavier weight is put to the weighing of a transmission method of better quality, and data dividers 120, 121 distribute data following the weighing, so that more data are distributed to the transmission methods of better quality. As a result, data communication quality can be improved.

As discussed above, the fourth embodiment proves the following matters: In a radio transmitting system that transmits and receives data by switching timewise plural transmission methods formed of plural mod/demod methods and carrier frequency bands, or in the system that includes a transmission device and a reception device which transmits and receives data simultaneously by plural transmission methods, re-transmission of missing data is requested, so that the quality of data communication is improved. In the foregoing system, transmission quality of the plural transmission methods is respectively judged, so that transmission methods of poor quality are not used or more data are distributed to transmission methods of better quality. As a result, quality of data communication can be improved.

The advantages described in this fourth embodiment, not to mention, do not depend on the reason of failure in receiving data.

Exemplary Embodiment 5

The fifth exemplary embodiment of the present invention is demonstrated hereinafter with reference to FIGS. 6A and 6B. Those drawings show procedures of transmitting data by switching timewise the transmission methods formed of mod/ demod methods and carrier frequencies in a radio transmitting system which includes a transmission device and a reception device in accordance with the fifth embodiment.

An operation of the foregoing system is demonstrated hereinafter. This system basically operate similarly to the systems including the transmission device and the reception device demonstrated in the first and second embodiments. In this fifth embodiment, a transmission method is switched to another one between radio apparatuses 102 and 103 for data transmission. Reasons of switching the transmission method can be prevention of interception of radio transmission by a third party, or prevention of lowering communication quality in a transmission method presently used.

Figures 6A, 6B:
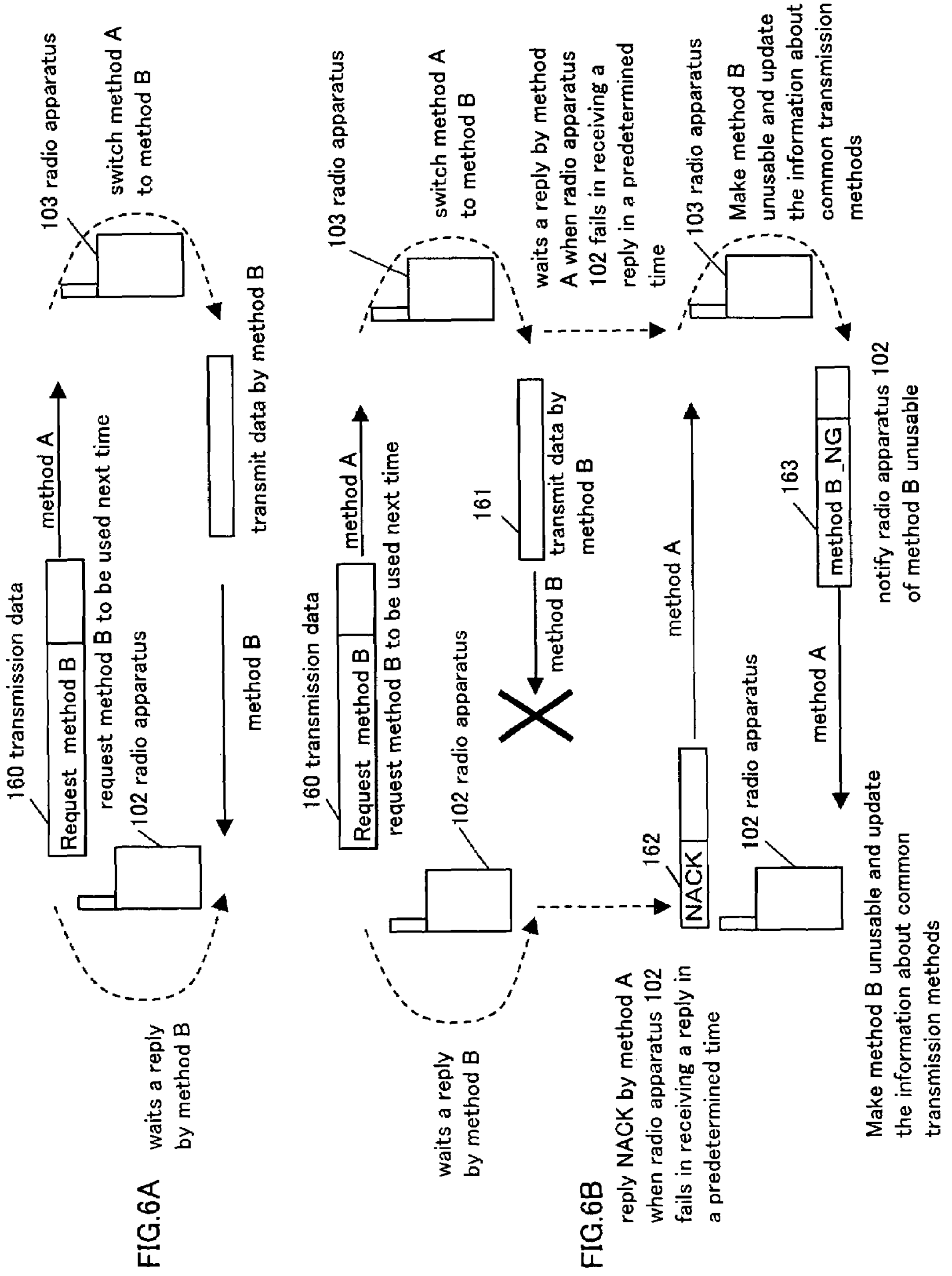
FIG. 6A shows a schematic diagram illustrating a flow of a switch-over of a communication method in a radio transmitting system including a transmission device and a reception device in accordance with a fifth exemplary embodiment of the present invention.
FIG. 6B shows a schematic diagram illustrating another flow of a switch-over of a communication method in the radio transmitting system including a transmission device and a reception device in accordance with the fifth exemplary embodiment of the present invention.

FIG. 6A shows a switching procedure. When radio apparatus 102 determines to switch transmission method A, apparatus 102 requests apparatus 103 to switch method A to method B, which apparatus 102 selects from among common transmission methods shared by both apparatuses 102 and 103 as information about the methods available to both of them, by transmitting data 160. Apparatus 102 then waits for a reply by transmission method B. Apparatus 103 receives the request, then switches the method to method B, and transmits data 161 to apparatus 102 as a reply.

Repetition of the foregoing procedure allows carrying out radio transmissions with transmission methods switching one after another, so that the third party encounters difficulty of following the methods switched one after another. As a result, a communication of high secrecy is achievable. In this procedure, apparatus 103 instead of apparatus 102 can initiate the request of switching a transmission method.

When the transmission method to be used by switching is not valid because transmission quality is not assured due to line situation, although apparatus 102 waits for a reply by method B after transmitting a switching request, it is not able to receive data 161, i.e. a reply from apparatus 103. Thus in the case when apparatus 102 fails in receiving the reply from apparatus 103 in a predetermined time, apparatus 102 transmits data 162 as a negative acknowledgement (NACK) by method A used before the switching.

Radio apparatus 103 transmits data by method B, and waits for a reply from apparatus 102 by method B; however, when it is not able to receive the reply in a predetermined time, it changes method B to method A to wait for the reply. In due course, apparatus 103 receives data 162 indicating NACK from apparatus 102, apparatus 103 determines that method B is not usable, then updates the information about the common transmission methods. Apparatus 103 also transmits data 163 to apparatus 102 to inform that method B is not usable.

In the procedure shown in FIG. 6, at the time when both of apparatuses 102 and 103 fail in receiving data in a predetermined time by method B, they can determine that method B is not usable, and thus update the information about the common transmission method.

A transmission method like method B, which is judged unusable due to line situation, can recover its quality well enough to be usable in due course, so that this kind of method is controlled separately from the transmission methods that originally cannot be used due to regulations or hardware limitations. The method then can undergo a judgement someday again whether or not it is usable by requesting a switch of a method.

The information apparatus 102 transmits the information about a transmission method to be used after the switch to apparatus 103 at the request of switching. The information includes specifically carrier frequencies and mod/demod methods. As demonstrated in the second embodiment, carrier frequencies having a number and mod/demod methods having a number allow notifying transmission methods between the apparatuses only with the numbers. It is preferable to encrypt the information about the transmission method to be used because the encryption causes a third party to encounter difficulty in intercepting the transmission.

In encrypting the information, a key necessary for the encryption should be shared between both the apparatuses at the initial stage of communication, or shared by another method in advance. Use of a serial number (identification number) proper to a normal radio apparatus in charge of transmission or reception as a parameter for the encryption makes a third party, which is not able to know the identification number, be unable to decrypt the transmission method to be used.

In the case when a transmission method is used in a different radio system from a present one, a given procedure is needed for establishing a communication session in the radio system to be used, which may take time. In such a case, communication sessions to be used in the future are established in advance between radio apparatuses 102 and 103, and those sessions are retained backstage while both the apparatuses use a transmission method of another radio system. This preparation allows a faster switching.

As discussed above, the fifth embodiment proves that data can be transmitted and received by switching a transmission method one after another timewise in a radio transmitting system, in which plural transmission methods formed by combining plural mod/demod methods and carrier frequencies can be used while the methods are switched timewise.

In this embodiment, radio apparatus 102 transmits a switching request, and immediately after the request, it switches method A to method B in order to wait for a reply. However, after apparatus 102 receives an acceptance from apparatus 103 by method A, apparatus 102 can switch method A to method B.

Exemplary Embodiment 6

Figure 7A:
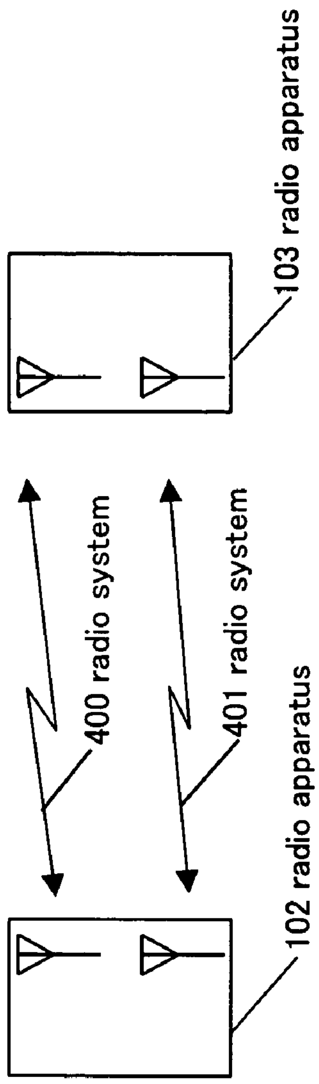
FIG. 7A schematically illustrates a structure of a radio apparatus including a transmission device and a reception device in accordance with a sixth exemplary embodiment of the present invention.
Figure 7B:
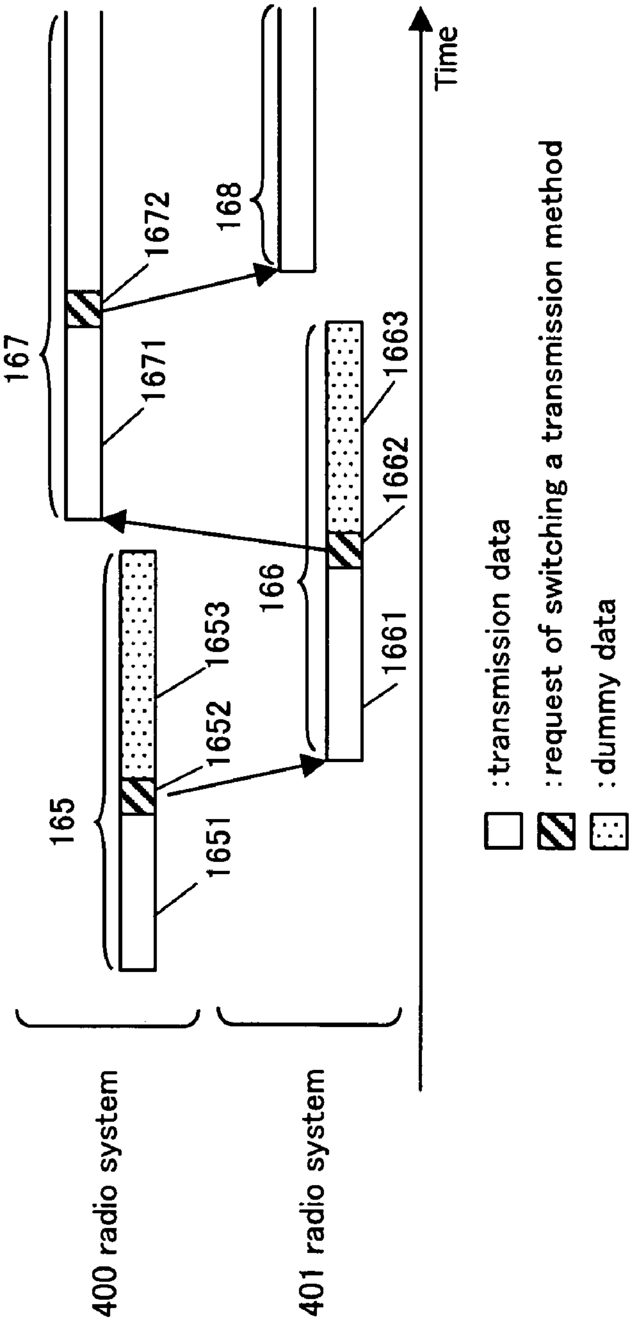
FIG. 7B schematically illustrates a flow of a switch-over of a communication method in a radio transmitting system including a transmission device and a reception device in accordance with the sixth exemplary embodiment of the present invention.

The sixth exemplary embodiment of the present invention is demonstrated hereinafter with reference to FIGS. 7A and 7B. FIG. 7A illustrates schematically radio apparatuses including a transmission device and a reception device in accordance with the sixth embodiment. FIG. 7B shows a flow of switching a communication method in the radio transmitting system including the transmission device and the reception device in accordance with the sixth embodiment.

An operation of the system is demonstrated hereinafter. The system basically operates similarly to those systems including the transmission device and reception device demonstrated in the first and second embodiments. As shown in FIG. 7A, radio apparatuses 102 and 103 have plural modems (not shown) and radio transceivers (not shown) respectively, so that radio systems 400 and 401 operative simultaneously are formed. The system thus can deal with max. two different transmission methods simultaneously.

FIG. 7B tells how the switching of a transmission method goes. Radio apparatuses 102 and 103 use first radio system 400 and transmits data 165 by a first transmission method. During the transmission of data 165, radio apparatus 102 transmits request 1652 of switching the first transmission method to a second method, then apparatus 102 uses radio system 401 and the second transmission method for transmitting data 166.

Next, apparatus 102 transmits request 1662 of switching the second method to a third method using radio system 401, then apparatus 102 uses radio system 400 and the third transmission method for transmitting data 167. Apparatus 102 then transmits request 1672 of switching the third method to a fourth method using radio system 400, and apparatus 102 transmits data 168 by the fourth method in radio system 401. The transmission methods are switched thereafter in a way similar to what is discussed above.

An instance shown in FIG. 7B demonstrates a radio transmission by two radio system simultaneously. On the other hand, use of dummy data 1653 and 1663 as first data allows the radio apparatus on the reception side to receive true data by tuning itself only to transmission methods which transmit the true data. In this case, the request of switching a transmission method should be transmitted by the transmission methods that transmit the true data. Both of the two transmission methods used in the two radio systems 400, 401 can transmit the true data simultaneously without using the dummy data. The information about which transmission method transmits the true data is shared between apparatuses 102 and 103 before the request of switching a transmission method is transmitted.

The radio transmitting system including the foregoing transmission device and the reception device makes it difficult for a third party to intercept the data transmitted because the third party cannot distinguish which is true data or dummy data from among the data transmitted in the plural radio systems. The third party thus must simultaneously receive and interpret all the signals transmitted from the radio devices.

A switch of a transmission method one after another makes it further difficult for the third party to intercept the data transmitted. A normal receiver can know the transmission methods one by one used for transmitting true data since the start of transmission, and makes its radio transceiver (not shown) follow the transmission methods used for true data, thereby receiving the data.

As discussed above, the sixth embodiment proves that data can be transmitted and received by switching a transmission method one after another timewise in a radio transmitting system, in which plural transmission methods formed by combining plural mod/demod methods and carrier frequencies can be used simultaneously. As a result, data transmission of higher secrecy is achievable.

In this sixth embodiment, two radio systems are used for transmitting data simultaneously. However, use of one radio system by switching a transmission method to be used at a high speed, so that a quasi-operation as simultaneous operation is produced. As a result, an advantage similar to what is discussed above is obtainable. In this embodiment, two radio systems are used; however, not to mention, more than two systems can be used.

Plural systems in different types such as a cellular system, PHS system, satellite cellular phone system, and radio LAN are used as different transmission methods. Then data to be transmitted are allotted to the respective radio systems for transmission and reception, thereby achieving the radio transmitting system including the transmission device and the reception device of the present invention.

INDUSTRIAL APPLICABILITY

A transmission device of the present invention includes a modulator that can modulate signals by plural modulation methods, and a transmitter that can transmit radio signals with plural carrier frequencies. The transmission device transmits data by changing a transmission communication method formed by combining a modulation method and a carrier frequency following the lapse of time. The data divided are thus allotted to plural modulation methods and carrier frequencies, and switched timewise for transmission one after another. This mechanism advantageously makes it difficult for a third device to intercept the radio wave, so that the transmission device is useful for keeping transmission data in high secrecy.

A reception device of the present invention includes a demodulator that can demodulate signals by plural demodulation methods, and a receiver that can receive radio signals with plural carrier frequencies. The reception device receives data by changing a reception communication method formed by combining a demodulation method and a carrier frequency following the lapse of time. The data divided are thus allotted to plural demodulation methods and carrier frequencies, and switched timewise for reception. This mechanism advantageously makes it difficult for a third device to intercept the radio wave, so that the reception device is useful for keeping transmission data in high secrecy.

The invention claimed is:

1. A transmission device comprising:

a modulator for modulating data by a plurality of modulation methods; and a transmitter for transmitting a radio signal by using a plurality of carrier frequencies, wherein the transmission device transmits the data by changing a transmission communication method to another method following a lapse of time, which transmission communication method is formed by combining one of the modulation methods and one of the carrier frequencies, and wherein the transmission device is configured to transmit the data repeatedly without changing the transmission communication method during a time period in which a receiving device is configured to sequentially switch through a plurality of different reception communication methods, each of the plurality of different reception communication methods formed by combining a respective one of a plurality of different demodulation methods and a respective one of the plurality of carrier frequencies at different times during the time period, each of the plurality of different reception communication methods formed of respectively different combinations of the different demodulation methods and carrier frequencies.

2. The transmission device of claim 1 further comprising:

a switcher of a transmission method, wherein at least one of the modulator or the transmitter is available in plural pieces, and the switcher switches the plural modulators or transmitters for switching the transmission communication method.

3. The transmission device of claim 1 further comprising:

a transmission communication method notifying section for notifying another device of a communication method desirable to be used on the transmission side; and a communication receivable method reply receiver for receiving a reply whether or not to receive the data by the communication method notified, wherein the transmission device transmits data thereafter by the communication method accepted by the another device to this another device.

4. The transmission device of claim 1 further comprising:

a data divider for dividing data into a plurality of pieces of data and putting each one of those plurality of pieces of the data a number to identify an order of each piece of the data in original data, wherein the lapse of time indicates a lapse based on information about the order.

5. The transmission device of claim 4 further comprising:

a re-transmission request receiver for receiving a request of re-transmitting a missing piece of the data from another device, wherein the transmission device re-transmits the missing part of the divided data based on the request.

6. The transmission device of claim 5, wherein the transmission device receives, at the re-transmission request receiver, information about a reception communication method available in the another device together with the re-transmission request, then the transmission device re-transmits the missing piece of the data requested re-transmission by an available communication method among the transmission communication methods corresponding to the communication methods available on the reception side, and when the transmission device receives an acknowledgement from the another device of the missing piece of the data re-transmitted based on the request, the transmission communication method used for successful re-transmission of the missing piece of divided data can be used for transmitting pieces of divided data thereafter.

7. The transmission device of claim 1 further comprising:

a demodulator for demodulating data by the plurality of demodulation methods; and a receiver for receiving a radio signal with the plurality of carrier frequencies, wherein the transmission device receives data by changing the reception communication method following a lapse of time, then wherein the transmitter transmits the data together with information about a reception communication method desirable to be changed, then wherein the receiver waits and receives information to be transmitted from another device by a communication method corresponding to the communication method desirable to be changed.

8. The transmission device of claim 7, wherein the information showing the communication method desirable to be changed is encrypted.

9. The transmission device of claim 8 including an identifying mark for identify the transmission device, wherein the identifying mark is used as a part of a key for the encryption.

10. A reception device comprising:

a demodulator for demodulating data by a plurality of demodulation methods; and a receiver for receiving a radio signal with a plurality of carrier frequencies wherein the reception device receives the data by changing a reception communication method following a lapse of time, and wherein the reception device is configured to sequentially switch through a plurality of different reception communication methods while a transmission device is configured to transmit the data repeatedly without changing a transmission communication method during a time period, the transmission communication method formed by combining a respective one of a plurality of different modulation methods and a respective one of the plurality of carrier frequencies, each of the plurality of different reception communication methods formed by combining a respective one of a plurality of different demodulation methods and a respective one of the plurality of carrier frequencies at different times during the time period, each of the plurality of different reception communication methods formed of respectively different combinations of the different demodulation methods and carrier frequencies.

11. The reception device of claim 10 further comprising:

a switcher of a transmission method, wherein at least one of the demodulator or the receiver is available in plural pieces, and the switcher switches the plural demodulators or receivers for switching the reception communication method.

12. The reception device of claim 10 further comprising:

a transmission communication method receiver for receiving a transmission communication method notified, as a desirable method to be used, by another device that has transmitted the data;

a communication receivable method selector for selecting a communication receivable method from among transmission side methods received at the transmission communication method receiver and desirable to be used; and a communication receivable method replying section for informing the another device of a communication receivable method selected by the communication receivable method selector.

13. The reception device of claim 12, wherein the reception device divides original data into a plurality of pieces of data, puts information about an order in the original data to each one of the plurality of pieces of data, and changes a combination of a modulation method and a carrier frequency following a lapse of time in response to every piece of data for transmission, then receives each piece of data transmitted at the receiver, wherein the reception device includes a data restoring section for restoring each piece of data received at the receiver into the original data based on the information about an order.

14. The receiver of claim 13, wherein the receiver judges which piece of data is missing based on the information about an order denoted to each piece of data, wherein the receiver includes a re-transmission request transmitter for requesting re-transmission of the missing piece of data.

15. The reception device of claim 14, wherein when the reception device fails in receiving the missing piece of data after the request of re-transmission, the re-transmission request transmitter requests re-transmitting the missing piece of data by a transmission communication method corresponding to another reception communication receivable method.

16. The reception device of claim 15 further comprising:

an acknowledgement transmitter for transmitting an acknowledgement together with information about a reception communication method successfully receiving the missing piece of data requested re-transmission.

17. The reception device of claim 10 further comprising:

a modulator for modulating data by a plurality of modulation methods; and wherein when the receiver receives the data together with information about a reception communication method desired by another device to change, a transmitter of the transmission device transmits data by switching the transmission communication method, to a method corresponding to the reception communication method desired to change.

18. The reception device of claim 17, wherein the information about the reception communication method desired to change is encrypted.

19. The reception device of claim 18 including an identifying mark for identify the another device, wherein the identifying mark is used as a part of a key for the encryption.

* * * * *

UNITED STATES PATENT AND TRADEMARK OFFICE

CERTIFICATE OF CORRECTION

PATENT NO. : 7,684,770 B2
APPLICATION NO. : 10/527247
DATED : March 23, 2010
INVENTOR(S) : Michiaki Matsuo It is certified that error appears in the above-identified patent and that said Letters Patent is hereby corrected as shown below:

On Page 2, item [56], References Cited, FOREIGN PATENT DOCUMENTS, please delete reference "10-327130 A 8/1998".

Signed and Sealed this

Third Day of August, 2010

David J. Kappos

*Director of the United States Patent and Trademark Office*